United States Patent [19]

Okumura et al.

[11] Patent Number: 5,744,405
[45] Date of Patent: Apr. 28, 1998

[54] PRODUCT OF VAPOR DEPOSITION AND METHOD OF MANUFACTURING SAME

[75] Inventors: Jiichiro Okumura, Kusatsu; Takao Negishi, Otsu, both of Japan

[73] Assignee: Toray Industries, Inc., Japan

[21] Appl. No.: 633,807

[22] PCT Filed: Aug. 22, 1994

[86] PCT No.: PCT/JP94/01379

§ 371 Date: Apr. 18, 1996

§ 102(e) Date: Apr. 18, 1996

[87] PCT Pub. No.: WO96/06216

PCT Pub. Date: Feb. 29, 1996

[51] Int. Cl.$^6$ ........................................................ B32B 9/04
[52] U.S. Cl. ........................... 442/71; 442/164; 428/447; 428/448; 428/450; 427/250; 427/255; 427/299; 427/404; 427/407.1; 427/411; 427/412; 427/412.1; 427/412.5
[58] Field of Search .................... 442/71; 428/164, 428/447, 448, 450; 427/250, 255, 299, 404, 407.1, 411, 412, 412.1, 412.5

[56] References Cited

FOREIGN PATENT DOCUMENTS

| | | |
|---|---|---|
| 42-10047 | 5/1967 | Japan . |
| 44-27173 | 11/1969 | Japan . |
| 51-33589 | 9/1976 | Japan . |
| 62-5058 | 2/1987 | Japan . |
| 62-108207 | 5/1987 | Japan . |
| 2-15663 | 4/1990 | Japan . |
| 3-82881 | 4/1991 | Japan . |
| 3-184840 | 8/1991 | Japan . |
| 3-67639 | 10/1991 | Japan . |
| 3-287863 | 12/1991 | Japan . |
| 5-331765 | 12/1993 | Japan ............................ D06M 11/83 |
| 6-146167 | 5/1994 | Japan ............................ D06M 11/83 |

*Primary Examiner*—Christopher Raimund
*Attorney, Agent, or Firm*—Austin R. Miller

[57] ABSTRACT

Disclosed is a product of vapor deposition comprising a vapor deposited thin film formed on a surface of an organic substrate through an intermediate agent which includes at least a silicone resin and silicon dioxide, and a method for manufacturing a product of vapor deposition, in which the silicon dioxide is produced by plasma treatment. Accordingly, the vapor deposition thin film is significantly improved in an adhesive strength to provide the product of vapor deposition with an excellent washing resistance and abrasion resistance.

18 Claims, 2 Drawing Sheets

PRODUCT OF VAPOR DEPOSITION AND METHOD OF MANUFACTURING SAME

TECHNICAL FIELD OF THE INVENTION

The present invention relates to a product of vapor deposition and a method for manufacturing the same, and specifically to a product of vapor deposition which can be improved in adhesive strength of a vapor deposited thin film and suitable to use for a fiber product or a sheet-like material formed with a vapor deposited thin film and a method for manufacturing the same.

BACKGROUND ART OF THE INVENTION

In an organic substrate, for example, a fiber product, having a vapor deposited thin film, for example, a metal vapor deposited thin film, the adhesive strength between the metal vapor deposited thin film and the fiber is unexpectedly low. Therefore, when it is washed (water washing, dry cleaning), most of the metal vapor deposited thin film falls off, and this is a problem for development in commercial goods.

In order to improve this defect, a method is performed for coating the fiber with a protecting film after vapor deposition. However, even if the protecting film is formed on the metal layer by any method, it is not a, and solution because the adhesive strength between the metal and the fiber is low. Namely, although the falling off of the metal deposited film may be temporarily suppressed, as time passes, or as the number of times of washing increases, the metal deposited film including the protecting film would be delaminated over a broad area.

On the other hand, an, fiber cloth indicating an interference color, which is made by vapor depositing a specified light interference thin film on a fiber cloth and which can be colored by light interference, was proposed by the applicant of the present invention, and it was already published (JP-A-HEI 382881).

Even in such a fiber cloth which is vapor deposited with a light interference thin film, because the light interference thin film is vapor deposited directly on surfaces of fibers exposed on a surface of the cloth, there remains a problem similar to that aforementioned, that is, a problem that the vapor deposited light interference thin film is poor in adhesive strength in a condition applied with friction or bending.

DISCLOSURE OF THE INVENTION

An object of the present invention is to solve such problems and to increase the adhesive strength of a vapor deposited thin film deposited on a surface of a fiber product (fiber cloth), or a sheet-like material or a product thereof, and ultimately to provide excellent washing resistance and abrasion resistance to the vapor deposition product.

To accomplish the above object, a product of vapor deposition according to the present invention comprises a vapor deposited thin film having a metal or an inorganic substance formed on at least a part of a surface of an organic substrate through an intermediate agent which contains at least a silicone-based resin and silicon dioxide.

In particular, as the silicon dioxide contained in the intermediate agent, one produced by plasma treatment is the most suitable. The intermediate agent is plasma treated from its surface. The silicon dioxide produced by such a plasma treatment can exist near the surface of the intermediate agent as well as it can be uniformly distributed in a dispersion condition close to a molecular order, thereby achieving a high adhesive strength for a vapor deposited thin film formed thereon. Particularly, if the intermediate agent is plasma treated so that the elemental composition of the intermediate agent is in a condition where one or more silicon atoms are present relative to two carbon atoms at least in a vicinity of the vapor deposited thin film, an extremely high adhesive strength can be realized.

Therefore, in order to provide such a high adhesive strength, a method for manufacturing a product of vapor deposition according to the present invention comprises the steps of providing a silicone-based resin on a surface of an organic substrate; performing plasma treatment on the surface of the silicone-based resin; and forming a thin film having a metal or an inorganic substance on the plasma-treated surface by vapor deposition.

In more detail, a method for manufacturing a product of vapor deposition according to the present invention comprises the steps of providing a silicone-based resin on a surface of an organic substrate; heat treating the silicone-based resin to form a silicone-based resin layer; performing plasma treatment on the surface of the silicone-based resin layer; and forming a thin film having a metal or an inorganic substance on the plasma-treated surface by vapor deposition.

Namely, in the method according to the present invention, firstly a film of a silicone-based resin is formed on a surface of a fiber cloth or a sheet-like material by coating or dipping, the silicone-based resin is heat treated to form a silicone-based resin layer, and the silicone-based resin is activated by plasma treatment applied thereon, more precisely, by a low-temperature plasma treatment (silicon dioxide is produced by plasma treatment uniformly at a molecular order), and a predetermined vapor deposited thin film is formed on the resin layer by vapor deposition. By formation of the activated silicone-based resin layer, the adhesive strength between the resin layer and the vapor deposited thin film can be greatly increased and a vapor deposited thin film hard to delaminate against friction or bending can be realized.

Further, in a case where silicon dioxide is contained in a silicone-based resin in advance, the silicone-based resin may be provided on a surface of an organic substrate by coating or dipping, and after drying, a metal or an inorganic substance is vapor deposited to form a vapor deposited thin film, thereby providing a relatively high adhesive strength.

THE BEST MODE FOR CARRYING OUT THE INVENTION

Figure 1:
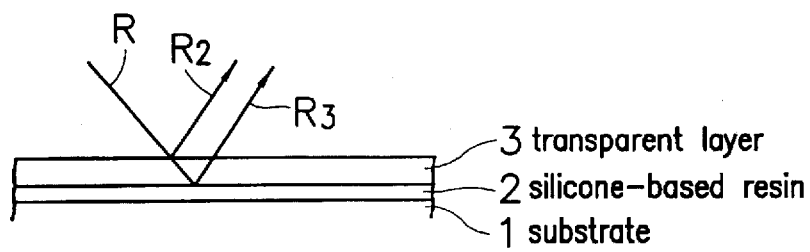
FIG. 1 is a schematic partial sectional view showing an embodiment of a product of vapor deposition indicating an interference color which is manufactured by a method according to the present invention.

As a silicone-based resin used in the present invention, for example, methylhydrodienepolysiloxane emulsion can be used, and as the catalyst, for example, a zinc-based catalyst can be used. In this case, the content of silicone in the methylhydrodienepolysiloxane emulsion is preferably in the range of about 2 to 10% by weight, and the content of the zinc-based catalyst is preferably in the range of about 2 to 10% by weight. Further, from the viewpoint of obtaining the advantage of a soft touch for a product of vapor deposition, a method using a melamine-based resin without using a catalyst can be appropriately employed. In such a case, the content of silicone in methylhydrodienepolysiloxane emulsion is preferred to be in the range of about 2 to 10% by weight, and the content of the melamine-based resin is preferred to be in the range of about 0.1 to 2% by weight. In a case where a melamine-based resin is used, a catalyst for the melamine-based resin can be used. In this case, the content of the catalyst in methylhydrodiene-polysiloxane emulsion is preferred to be in the range of about 0.02 to 0.4% by weight.

As a method for providing a silicone-based resin on a surface of a fiber cloth or a sheet-like material, for example, a dipping method can be employed, and the contraction percentage thereof is preferably in the range of about 20 to 60%. Further, as a condition of drying and curing after providing the resin, a continuous condition at a temperature of 160° to 180° C. for about 2 minutes is preferred. Curing after drying at 110° to 130° C. is further preferred.

As a condition for low-temperature plasma treatment for example, a condition of a vacuum degree of about 20 to 100 Pa, a discharge electric power of about 2 to 7 kV and a treatment speed of about 5 to 30 m/min. is appropriate. The atmosphere for the treatment may be either air or a gas such as oxygen or argon. The surface to be treated may be both surfaces, and the treatment may be performed on at least a surface to be vapor deposited. Although the degree of the low-temperature plasma treatment must be changed depending upon the chemical composition of a silicone-based resin, from the advantages obtained, the elemental composition of the silicone-based resin is preferably controlled so that one or more silicon atoms are present relative to two carbon atoms at least in a vicinity of a vapor deposited thin film, from the viewpoint of adhesive property.

A substrate used in the present invention is not particularly restricted, and for example, it is a fiber cloth or a sheet-like material. As the fiber cloth, for example, a cloth composed of chemical fibers such as polyester, polyamide, polyacrylic or rayon fibers or a cloth composed of natural fibers such as cotton or silk fibers can be used, and a thin cloth through a thick cloth can be applied. As the sheet-like material, for example, a plastic film or a paper can be employed.

Particularly in the fiber cloth, a hard twist cloth such as georgette crepe or de Chine crepe, a cloth having an irregularity such as a cloth applied with embossing finish or wrinkling finish, a cloth applied with raising or gigging, a monofilament cloth and a dyed cloth can be appropriately used.

When a vapor deposited thin film is formed on such a fiber cloth, a product exhibiting an interference color can be obtained. Generally, an interference color changes depending upon the angle between an interference surface and a line of sight. In a case of a substrate of a hard twist cloth, the substrate has a high draping property, and it exhibits a new sense with a drape feeling by a smooth motion of the cloth and change of the interference color thereof indicated in accordance with the motion and it becomes a high-grade cloth. In a case of a substrate of a cloth having an irregularity, because a vapor deposited thin film is formed along the irregularity, the interference color exhibits changes in accordance with the irregularity, and it becomes a high-grade cloth indicating a new sense with a stereo feeling. In a case of a substrate of a cloth applied with raising or gigging, the interference color exhibits changes in accordance with the falling direction or the motion of the raised fibers, and it becomes a high-grade cloth exhibiting a new sense with a surface volume feeling. In a case of a substrate of a monofilament cloth, generally a clear interference color is exhibiting because the filaments are thick, and generally the cloth becomes a see-through type because the gap between the filaments is relatively great. Therefore, it becomes a high-grade cloth exhibiting a new sense with a dark color and a see-through feeling.

The material for vapor deposition is not particularly limited, and for example, metals and inorganic substances can be employed.

The metals used as the materials for vapor deposition are not particularly restricted, and for example, Al, Au, Cr, Cu, Mg, Ni, Ti, Co, Pt and Si can be used. The oxides of the inorganic substances used as the materials for vapor deposition are not particularly restricted, and for example, $Al_2O_3$, $In_2O_3$, $Cr_2O_3$, MgO, SiO, $SiO_2$, TiO, $TiO_2$, ITO and $SnO_2$ can be used, and the nitrides of the inorganic substances used are not particularly restricted, and for example, AlN, TiN and $Si_3N_4$ can be used. As another substance, $MgF_2$ also can be used.

Further, the layer structure of a vapor deposited thin film may be either a single-layer structure or a multi-layer lamination structure.

Such a vapor deposited thin film is vapor deposited on the silicone-based resin containing silicon dioxide, preferably on the silicone-based resin layer applied with low-temperature plasma treatment, as aforementioned. Then, a high adhesive strength can be achieved between the thin film and the activated silicone-based resin layer as aforementioned. Between the silicone-based resin layer and the organic substrate, originally a good adhesive property is ensured. The method of vapor deposition is not particularly restricted, and for example, a method for placing a substrate in a known thin film forming apparatus such as a vacuum vapor deposition apparatus, a sputtering apparatus or an ion plating apparatus and forming a vapor deposited thin film under a pressure reducing condition can be used.

The above-described increase of the adhesive strength can be achieved by formation of a silicone-based resin layer containing silicon dioxide, preferably, formation of a silicone-based resin layer applied with low-temperature plasma treatment.

Such an high adhesive strength cannot be obtained by other resin layers. For analysis of the atomic condition of a surface of a silicone-based resin layer, X-ray photoelectric spectral analysis can be used. Further,for analysis of elemental composition (ratio of number of atoms), Auger electron spectral analysis can be used. Furthermore, in a case after formation of a vapor deposited thin film, a method for analyzing it while etching the film by using ion etching method together can be used.

After a metal or an inorganic substance is vapor deposited and a vapor deposited thin film is formed, it is preferred that a heat treatment is performed preferably at a temperature of not lower than 130° C., more preferably at a temperature of not lower than 170° C. By such a heat treatment, the vapor deposited thin film, particularly the surface thereof, is oxidized to form an oxidized thin film, and the strength of the thin film can be increased as well as the interference color of a fiber cloth described later can be further clarified and it can exhibit a metal gloss. Further, in order to protect a vapor deposited thin film, a protecting layer may be coated on the vapor deposited thin film as needed after vapor deposition and heat treatment.

Durabilities in cases where respective resins are provided and in cases where plasma treatment is performed and where plasma treatment is not performed in each resin are shown and compared in Table 1. Target high washing resistance and high abrasion resistance can be obtained only in a case where the resin is a silicone-based resin and particularly the low-temperature plasma treatment is applied. Silicon dioxide is not contained in the silicone-based resin when the low temperature plasma treatment is not applied. Table 1 shows a comparison with respect to a case where heat treatment is performed before plasma treatment and vapor deposition.

TABLE 1

| Resin | Plasma treatment | Washing resistance | Abrasion resistance dry | wet |
| --- | --- | --- | --- | --- |
| acrylic-based resin | none | 1 | 1–2 | 1–2 |
| | performed | 1 | 1–2 | 2 |
| vinyl acetate-based resin | none | 1 | 1–2 | 1–2 |
| | performed | 1 | 1–2 | 2 |
| silicone-based resin | none | 2 | 2–3 | 3 |
| | performed | 5 | 4–5 | 5 |
| fluorine-based resin | none | 1 | 2 | 2 |
| | performed | 2 | 2 | 3 |
| polyester-based resin | none | 1 | 1–2 | 1–2 |
| | performed | 1 | 1–2 | 2 |
| melamine-based resin | none | 1 | 1–2 | 1–2 |
| | performed | 1 | 1–2 | 2 |

Conditions for the test shown in Table 1 are as follows.
Vapor deposited thin film: Al/SiO/Cr
Washing resistance of thin film: based on JIS-L-1096 L-5 method (corresponding to AATCC-124)
AATCC: Technical Manual of the American Association of Textile Chemists and Colorists
Abrasion resistance: based on JIS-L-0849, II-type (corresponding to AATCC-8)
Cloth used: plain woven fabric using polyester filaments (the same as one used in Example 1 described later)

The product of vapor deposition and the method for manufacturing the same according to the present invention also can be applied, for example, in a case where the vapor deposited thin film is an electromagnetic wave interference thin film, for example, a light interference thin film. Namely, it can be applied in a case where a fiber cloth or a sheet-like material indicating an interference color is obtained by vapor depositing a light interference thin film.

In such a fiber cloth or a sheet-like material indicating an interference color, the afore-mentioned silicone-based resin layer is formed, and after low-temperature plasma treatment is applied on the resin layer, a light interference thin film is vapor deposited thereon.

This light interference thin film can be formed as the following various structures.

Firstly, in a case where a light interference thin film is composed of only a transparent layer, as shown in FIG. 1, a transparent layer 3, for example, a transparent layer 3 formed from a transparent metal compound thin film, is provided by vapor deposition on a silicone-based resin layer 2 provided on one surface or both surfaces of a substrate 1 formed from a fiber cloth or a sheet-like material.

As the material for the transparent metal compound thin film, for example, at least one selected from the group consisting of $Al_2O_3$, $In_2O_3$, $Cr_2O_3$, MgO, SiO, $SiO_2$, TiO, $TiO_2$, AlN, TiN, $Si_3N_4$ and $MgF_2$ can be used.

Such a substrate 1 laminated with transparent layer 3 can exhibit a color by interference between a reflected light $R_2$ at the surface of the transparent layer 3 of an incident light R from the surface side of the transparent layer 3 and a reflected light $R_3$ at the back surface of the transparent layer 3 of the incident light R, that is, a reflected light at a boundary surface between the transparent layer and the substrate adjacent to the transparent layer (or a silicone-based resin layer 2).

This color changes variously depending upon the material of transparent layer 3, the color of substrate 1 and the thickness of the transparent layer 3. Particularly, in order to obtain a bright color, the thickness of transparent layer 3 is preferably in the range of not less than 400 Å and not more than 5000 Å.

Figure 2:
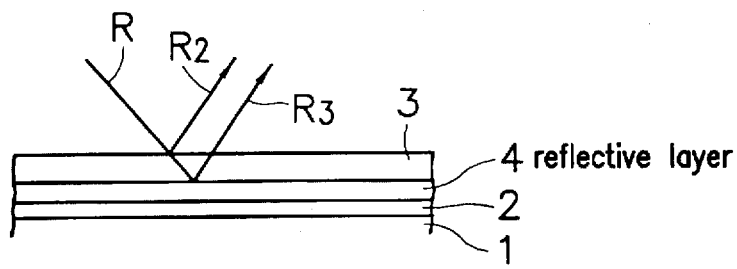
FIG. 2 is a schematic partial sectional view of a product of vapor deposition indicating an interference color according to another embodiment of the present invention.

Further, as shown in FIG. 2, a light interference thin film may be formed as a two-layer structure in which a reflective layer 4 and transparent layer 3 are laminated in this order from the side of substrate 1. The reflective layer 4 is formed, for example, as a metal thin film having a mean reflectance in a visual ray area of not less than 60% (preferably not less than 90%), and as the material of such a reflective metal thin film, for example, at least one selected from the group consisting of Al, Cu, Ag, Mg, Ti, Ni, Co, Pt, Au, Cr, Re and Rh can be used. Such a reflective layer 4 also can be formed by vapor deposition. The thickness of the reflective metal thin film forming the reflective layer 4 is preferably not less than 500 Å. Even in this case, the thickness of transparent layer 3 is preferably in the range of not less than 400 Å and not more than 5000 Å.

Such a substrate 1 laminated with reflective layer 4 and transparent layer 3 in that order can exhibit a color by interference between a reflected light $R_2$ at the surface of the transparent layer 3 of an incident light R from the surface side of the transparent layer 3 and a reflected light $R_3$ at the back surface of the transparent layer 3 of the incident light R, that is, a reflected light at a boundary surface between the transparent layer 3 and the reflective layer 4.

Figure 3:
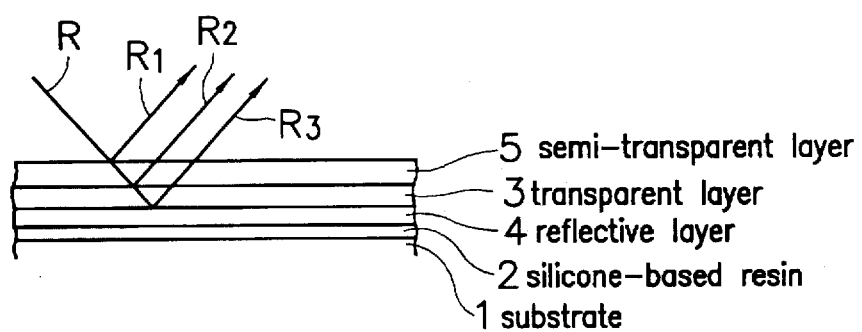
FIG. 3 is a schematic partial sectional view of a product of vapor deposition indicating an interference color according to a further embodiment of the present invention.

Further, as shown in FIG. 3, a light interference thin film may be formed as a three-layer structure with the above-described reflective layer 4, transparent layer 3 and a semi-transparent layer 5 in this order from the side of the substrate 1. The semi-transparent layer 5 is formed, for example, as a semi-transparent metal thin film having a mean reflectance in a visual ray area of not more than 60%, and as the material of such a semi-transparent metal thin film, for example, at least one selected from the group consisting of Al, Cu, Ag, Mg, Ti, Ni, Co, Pt, In, Cr, Si, Au and Au/Pt can be used. Such a semi-transparent layer 5 also can be formed by vapor deposition. The thickness of the semi-transparent metal thin film forming the semi-transparent layer 5 is preferably in the range of not less than 20 Å and not more than 500 Å. Even in this case, the thickness of transparent layer 3 is preferably in the range of not less than 400 Å and not more than 5000 Å. Further, the thickness of reflective layer 4 is preferably not less than 500 Å.

In such a substrate 1 laminated with reflective layer 4, transparent layer 3 and semi-transparent layer 5 in this order, an incident light R from the surface side generates reflected lights $R_1$, $R_2$ and $R_3$ at the surface of the semi-transparent layer 5, the surface of the transparent layer 3 and the surface of the reflective layer 4 (the back surface of the transparent layer 3), respectively, and an interference color is indicated by interference between the reflected lights $R_1$, $R_2$ and $R_3$.

Figure 4:
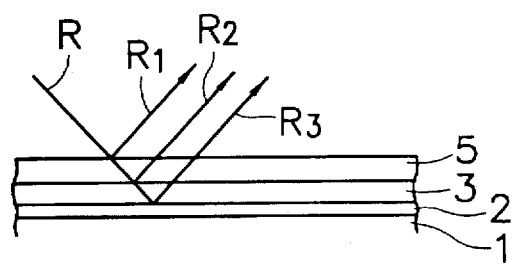
FIG. 4 is a schematic partial sectional view of a product of vapor deposition indicating an interference color according to a still further embodiment of the present invention.

Furthermore, as shown in FIG. 4, a light interference thin film may be formed as a two-layer structure with the above-described transparent layer 3 and semi-transparent layer 5 in this order from the side of the substrate 1. In such a substrate 1, a color is indicated mainly by interference between the reflected lights $R_2$ and $R_3$.

Further, although figures are omitted, a protecting film may be provided on the surface of a light interference thin film, for example, by coating, depending upon the requirement. The protecting film is preferably a substantially almost completely transparent one so as not to damage the incidence of a light into the light interference thin film and the interference color from the light interference thin film. However, it may be colored.

Figure 5:
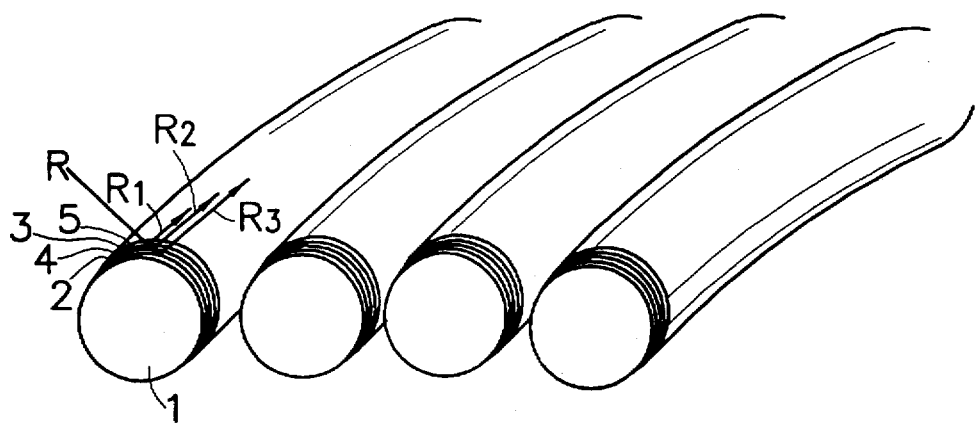
FIG. 5 is a schematic partial perspective view showing an embodiment of a product of vapor deposition in which, in a case where a substrate is a fiber product, a vapor deposited thin film is formed on a surface of each fiber exposed on a surface of the fiber product.

FIG. 5 shows an embodiment wherein, for example, a light interference thin film shown in FIG. 3 is provided on a substrate 1 of a fiber product, and shows it by enlarging the surface portion.

In a substrate having the above-described light interference thin film, in a case of a transparent or semi-transparent substrate, an interference color due to the light interference thin film can be observed through the substrate from the back surface side of the substrate. For example, a transparent-type fiber cloth can be formed, wherein a silicone-based resin layer similar to one aforementioned (formed as transparent or semi-transparent one) is provided on one surface of a transparent or semi-transparent fiber cloth, a transparent layer composed of a substantially transparent thin film capable of exhibiting a color by interference between a reflected light at the surface of the layer and a reflected light at the back surface of the layer of a light transmitted through the transparent-type fiber cloth is provided on the silicone-based resin layer, and a reflective layer reflecting a light transmitted through the transparent layer is provided on the transparent layer.

Figure 6:
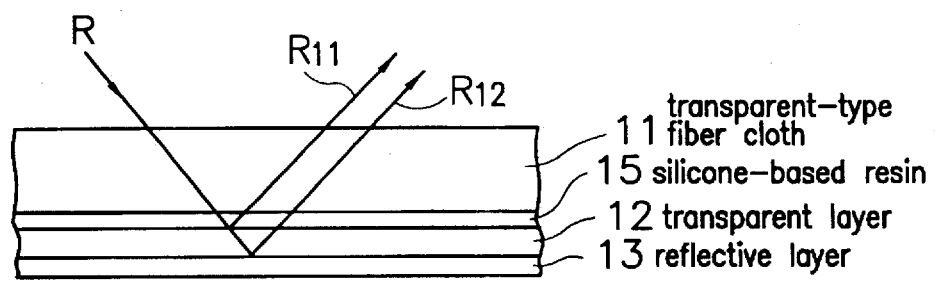
FIG. 6 is a schematic partial sectional view showing an embodiment of a product of vapor deposition using a transparent substrate.
Figure 7:
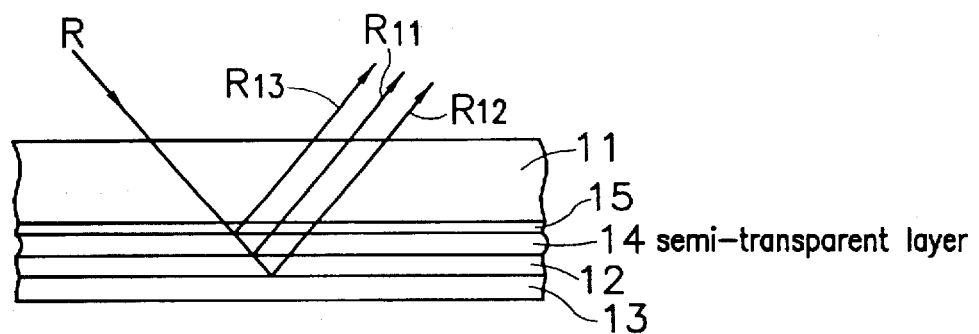
FIG. 7 is a schematic partial sectional view of a product of vapor deposition using a transparent substrate according to another embodiment of the present invention.

For example, as shown in FIG. 6, a transparent or semi-transparent silicone-based resin layer 15 containing silicon dioxide is provided on a transparent-type fiber cloth 11, and a transparent layer 12 and a reflective layer 13 are provided thereon in order. Further, as shown in FIG. 7, a semi-transparent layer 14 may be provided between the silicone-based resin layer 15 and the transparent layer 12.

In such structures, reflected lights $R_{11}$, and $R_{12}$ or reflected lights $R_{11}$, $R_{12}$ and $R_{13}$ of a light R transmitted through the substrate 11 (transparent-type fiber cloth) interfere with each other, and an interference color can be observed from the back surface side of the substrate 11.

EXAMPLES

More concrete examples of the present invention will be hereunder explained. EXAMPLE 1

After a woven fabric having a plain weave structure (10 warps/inch, 81 wefts/inch) of polyester filamentary yarns (warp: 50 deniers×18 filaments, nearly circular-section fiber, weft: 75 deniers×36 filaments, nearly circular-section fiber) was finished by degumming, a silicone was provided thereto by dipping, and it was heat treated at a temperature of 160° C. to form a silicone-based resin. Thereafter, low-temperature plasma treatment was performed, and Al was vapor deposited on one surface of the woven fabric by induction heating vacuum vapor deposition so as to form a metal thin film having a thickness of 800 Å.

The silicone-based resin used was methylhydrodiene-polysiloxane emulsion, and a zinc-based catalyst was used. The condition for the dipping treatment and the condition for the plasma treatment where as follows.

Dipping treatment

Content of silicone-based resin: 7%

Content of zinc-based catalyst: 7%

Contraction percentage of dipping treatment: 40%

Drying Curing: 160° C.×2 minutes, continuous

Plasma treatment

Degree of vacuum: 40 Pa

Treatment atmosphere: in the atmosphere

Electric power for discharge: 5.5 kV

Treatment speed: 20 m/min.

Treatment surface: both surfaces

As a result, the Al vapor deposited thin film was improved in adhesive strength to fibers against friction and bending. In EXAMPLE 1, the washing resistance was increased from rank 2 to rank 5 and the abrasion resistance was increased from rank 1 to rank 3, respectively, by plasma treatment after providing the silicone-based resin. The conditions for the determination are as follows.

Washing resistance: based on JIS-L-1096 L-5 method (corresponding to AATCC-124)

Abrasion resistance: based on JIS-L-0849, II-type (corresponding to AATCC-8)

Further, in this EXAMPLE 1, the surface of the silicone-based resin layer after and before the low-temperature plasma treatment was analyzed by X-ray photoelectric spectral analysis, and the resulting ratio of the number of carbon atoms to the number of silicon atoms and ratio of Si in silicone compounds to Si in $SiO_2$ are shown in Table 2. From the result, it is understood that silicon dioxide is greatly increased in the silicone-based resin by low-temperature plasma treatment. It is considered that this silicon dioxide generated by the plasma treatment greatly contributes to on increase of the adhesive strength.

TABLE 2

| Sample | Si (%) in silicone compounds:Si (%) in $SiO_2$ | Carbon atom:Silicon atom |
| --- | --- | --- |
| before plasma treatment | 92:8 | 1.00:0.38 |
| after plasma treatment | 26:74 | 1.00:0.80 |

X-ray photoelectric spectral analysis is performed by determining the intensity of a photoelectron discharged from a surface of a sample by excitation by X-ray applied to the surface of the sample as a function of kinetic energy and a photoelectric spectrum is obtained therefrom. It can be utilized for elemental analysis of a substance as well for composition analysis of a substance from the ratio of peak intensities of the inner-shell photoelectron. Further, because the value of binding energy of the inner-shell photoelectron changes depending upon the chemical binding condition even in an identical element, it can be utilized for analysis of state.

The condition of the X-ray photoelectric spectral analysis in this EXAMPLE is as follows.

Source of X-ray: Mgkα
Output power of X-ray: 10 kV, 20 mA
Analyzer: pass energy: WIDE SCAN 50 eV
NARROW SCAN 20 eV resolving power: 1 eV
Degree of vacuum: ~1×10$^{-8}$ mbar
Geometry: θ (discharge angle)=0°

EXAMPLE 2

A woven fabric (warp: about 80 filaments/inch, weft: about 100 filaments/inch, weave structure: 2/2 twill) was made using a shrinkage-difference combined yarn prepared by applying a fluid filament combining treatment to a yarn paralleled with a high-shrinkage polyester filamentary yarn (50 deniers×24 filaments, nearly circular-section fiber, boiling water shrinkage percentage: about 20%) and a low-shrinkage polyester filamentary yarn (50 deniers×48 filaments, nearly triangular-section fiber, boiling water shrinkage percentage: about 7%) and thereafter providing a twist of about 200 times/m to the paralleled yarn. Then, a relax treatment, an alkali treatment and a finishing treatment were applied to the woven fabric to prepare a yarn-length difference combined yarn cloth. Thereafter, a silicone-based resin was provided to the cloth by dipping and it was dried and cured. After a plasma treatment performed thereon, a light interference thin film having a three-layer structure shown in FIG. 3 was vapor deposited on one surface of the yarn-length difference combined yarn cloth by induction heating vacuum vapor deposition. The conditions of the dipping and the plasma treatment for the silicone-based resin were the same as those in EXAMPLE 1.

A reflective layer was formed from Al and the thickness thereof was set to 800 Å. Transparent layers were formed from SiO and the respective thicknesses were set to 800 Å, 1000 Å, 1200 and 1500 Å. A semi-transparent layer was formed from Cr and the thickness thereof was set to 30 Å. After these reflective, transparent and semi-transparent layers were vapor deposited, it was heat treated at 170° C. for 2 minutes, and further, polydimethylpolysiloxane-based silicone was coated as a protecting layer thereon and then, it was heat treated at 130° C. for 2 minutes.

As a result, the adhesive strength to the fibers of the vapor deposited thin film formed as a lower layer could be increased against washing, friction and bending. By this, the intermediate layer and the upper layer did not fall off, and in the cloth having a transparent layer with a thickness of 800 Å, a deep color being mainly blue was obtained. In the cloth having a transparent layer with a thickness of 1000 Å, a deep color being mainly green was obtained. In the cloth having a transparent layer with a thickness of 1200 Å, a deep color being mainly yellow was obtained. In the cloth having a transparent layer with a thickness of 1500 Å, a deep color indicating mainly a red could be obtained.

In this EXAMPLE 2, the washing resistance was increased from rank 3 to rank 5 and the abrasion resistance was increased from rank 2 to rank 4, respectively, by plasma treatment after providing the silicone-based resin. The conditions for the determination where as follows.

Washing resistance: based on JIS-L-1096 L-5 method (corresponding to AATCC-124)
Abrasion resistance: based on JIS-L-0849, II-type (corresponding to AATCC-8)

In the obtained yarn-length difference combined yarn cloth, the tint changes were complicated depending upon the angle of sight, there was a color tone having a high-grade feeling, the surface irregularity due to the yarn-length difference combined yarn was more stereoscopic and the bulgier and the colors of the respective portions to change complicatedly.

Further, the surface after and before the low-temperature plasma treatment was analyzed by X-ray photoelectric spectral analysis, and the resulting ratio of the number of carbon atoms to the number of silicon atoms and ratio of Si in silicone compounds to Si in $SiO_2$ are shown in Table 3. From the result, it is understood that silicon dioxide is increased in the silicone-based resin by low-temperature plasma treatment.

TABLE 3

| Sample | Si (%) in silicone compounds:Si (%) in $SiO_2$ | Carbon atom:Silicon atom |
|---|---|---|
| before plasma treatment | 94:6 | 1.00:0.35 |
| after plasma treatment | 23:77 | 1.00:0.84 |

Thus, in a product of vapor deposition and a method for manufacturing the same according to the present invention, by the presence of silicon dioxide as a intermediate agent, particularly silicon dioxide produced by plasma treatment, an extremely high adhesive strength can be obtained between a substrate and a vapor deposited thin film, and a fiber product or sheet-like material with a vapor deposited thin film hard to be delaminated and having excellent washing resistance and abrasion resistance can be obtained.

Industrial Applications of the Invention

In a product of vapor deposition according to the present invention, because a vapor deposited thin film is adhered at an extremely high adhesive strength, excellent washing resistance and abrasion resistance can be obtained, and the present invention can be appropriately applied particularly to a vapor deposited thin film-formed fiber product or sheet-like material which is washed and used repeatedly.

We claim:

1. A product of vapor deposition comprising a vapor deposited thin film of a metal or an inorganic substance formed on at least a part of a surface of an organic substrate through an intermediate agent, said intermediate agent consisting essentially of a silicone resin and an adherent form of silicon dioxide formed by plasma treatment of the silicone resin.

2. A product of vapor deposition according to claim 1, wherein said organic substrate comprises a polyester.

3. A product of vapor deposition according to claim 1, wherein said organic substrate is a sheet.

4. A product of vapor deposition according to claim 1 or 2, wherein said organic substrate is a fiber material.

5. A product of vapor deposition according to claim 1, 2 or 3, wherein, in the elemental composition of said silicone resin, one or more silicon atoms are present relative to two carbon atoms at least in the vicinity of said vapor deposited thin film.

6. A product of vapor deposition according to claim 1, wherein said vapor deposited thin film is an electromagnetic wave interference thin film.

7. A product of vapor deposition according to claim 6, wherein said electromagnetic wave interference thin film is a light interference thin film having a transparent layer of a substantially transparent thin film which can be colored by interference between a reflected light at the surface of said transparent layer and a reflected light at the back surface of said transparent layer of an incident light from the surface side of said transparent layer.

8. A product of vapor deposition according to claim 7, wherein said light interference thin film is formed only from said transparent layer.

9. A product of vapor deposition according to claim 7, wherein said light interference thin film is formed as a thin film having a two-layer structure in which a reflective layer having a mean reflectance in a visual ray area of not less than 60% and said transparent layer are laminated in this order from the side of said substrate.

10. A product of vapor deposition according to claim 7, wherein said light interference thin film is formed as a thin film having a three-layer structure in which a reflective layer having a mean reflectance in a visual ray area of not less than 60%, said transparent layer and a semi-transparent layer having a mean reflectance in a visual ray area of not more than 60% are laminated in this order from the side of said substrate.

11. A product of vapor deposition according to claim 7, wherein said light interference thin film is formed as a thin film having a two-layer structure in which said transparent layer and a semi-transparent layer having a mean reflectance in a visual ray area of not more than 60% are laminated in this order from the side of said substrate.

12. A method for manufacturing a product of vapor deposition comprising the steps of:

provide a coating consisting essentially of a silicone resin on a surface of an organic substrate;

performing plasma treatment on the surface of said silicone resin to produce an adherent form of silicon dioxide; and vapor depositing a thin film of a metal or an inorganic substance on the plasma treated surface.

13. A method for manufacturing a product of vapor deposition according to claim 12, wherein, after said silicone resin is provided on a surface of said organic substrate and before said plasma treatment, said silicone resin is heat treated to form a cross-linked silicone resin layer.

14. A method for manufacturing a product of vapor deposition according to claim 12 or 13, wherein said vapor deposition is performed by vapor depositing a light interference thin film having a transparent layer of a substantially transparent thin film, which can be colored by interference between a reflected light at the surface of said transparent layer and a reflected light at the back surface of said transparent layer of an incident light from the surface side of said transparent layer, on at least one surface of said substrate.

15. A method for manufacturing a product of vapor deposition according to claim 14, wherein said light interference thin film is formed only from said transparent layer.

16. A method for manufacturing a product of vapor deposition according to claim 14, wherein said light interference thin film is formed as a thin film having a two-layer structure in which a reflective layer having a mean reflectance in a visual ray area of not less than 60% and said transparent layer are laminated in this order from the side of said substrate.

17. A method for manufacturing a product of vapor deposition according to claim 14, wherein said light interference thin film is formed as a thin film having a three-layer structure in which a reflective layer having a mean reflectance in a visual ray area of not less than 60%, said transparent layer and a semi-transparent layer having a mean reflectance in a visual ray area of not more than 60% are laminated in this order from the side of said substrate.

18. A method for manufacturing a product of vapor deposition according to claim 14, wherein said light interference thin film is formed as a thin film having a two-layer structure in which said transparent layer and a semi-transparent layer having a mean reflectance in a visual ray area of not more than 60% are laminated in this order from the side of said substrate.

* * * * *